United States Patent
Peiperl

[11] 3,927,461
[45] Dec. 23, 1975

[54] METHOD OF MAKING RANDOMLY DIFFERENT DISPLAY DEVICES

[76] Inventor: Adam Peiperl, 1135 Loxford Terrace, Silver Spring, Md. 20901

[22] Filed: Oct. 5, 1973

[21] Appl. No.: 404,009

[52] U.S. Cl. .......................... 29/424; 264/2; 264/80; 264/234
[51] Int. Cl.² ..................................... B29C 25/00
[58] Field of Search ................ 264/80, 234, 2, 238; 40/106.52, 33, 77, 130 A; 240/9.5, 10 R, 10.1; 29/424

[56] References Cited
UNITED STATES PATENTS

| | | | |
|---|---|---|---|
| 2,473,857 | 6/1949 | Burchell | 40/130 A |
| 3,235,631 | 2/1966 | Shelanski | 264/2 |
| 3,315,391 | 4/1967 | Lane et al. | 40/106.52 |
| 3,454,413 | 7/1969 | Miller | 264/80 |
| 3,679,888 | 7/1972 | Reiback | 40/106.52 |
| 3,694,054 | 9/1972 | Kirsch | 40/130 A |
| 3,762,082 | 10/1973 | Mincy | 240/10.1 |
| 3,793,755 | 2/1974 | Gersch et al. | 40/106.52 |

*Primary Examiner*—Robert F. White
*Assistant Examiner*—Gene Auville
*Attorney, Agent, or Firm*—A. Fred Starobin

[57] ABSTRACT

Method of forming randomly different display devices using birefringent material viewed in polarized light by subjecting birefringent material to spray of water droplets followed by application of flame to same area having droplets thereon.

4 Claims, 5 Drawing Figures

METHOD OF MAKING RANDOMLY DIFFERENT DISPLAY DEVICES

BACKGROUND OF THE INVENTION

The present invention refers to display devices of birefringent material viewed in polarized light, and particularly to the preparation and display of such birefringent material.

Birefringent material subjected to certain stresses will show many different colors when viewed in polarized light. This display of color is enhanced through movement of the birefringent material.

SUMMARY OF THE INVENTION

The present invention deals with a method of preparing such birefringent material for display in polarized light so as to form a randomly different display from each piece of birefringent material.

The method of the present invention deals with the application of droplets of a non-flammable non-volatile liquid such as water followed by a flame or similar source of intense heat to a formed piece or sheet of birefringent material.

The birefringent material is displayed after preparation between sheets of properly oriented polarizers while it is mounted on a turntable for rotation thereon and with a light source on the opposite side from the viewing side.

The present invention allows the manufacture of display devices of the type utilizing birefringent material viewed under polarized light so as to produce randomly different designs.

It is a further object of this invention to allow mass production of these devices in a most expeditious manner while still making each of them different from the others.

It is a still further object of this invention to display the birefringent material to obtain a wide range of color display.

BRIEF DESCRIPTION OF THE DRAWINGS

The above and other objects and advantages of the invention will become apparent upon full consideration of the following detailed description and accompanying drawing in which.

DESCRIPTION OF THE PREFERRED EMBODIMENT

Figure 1:
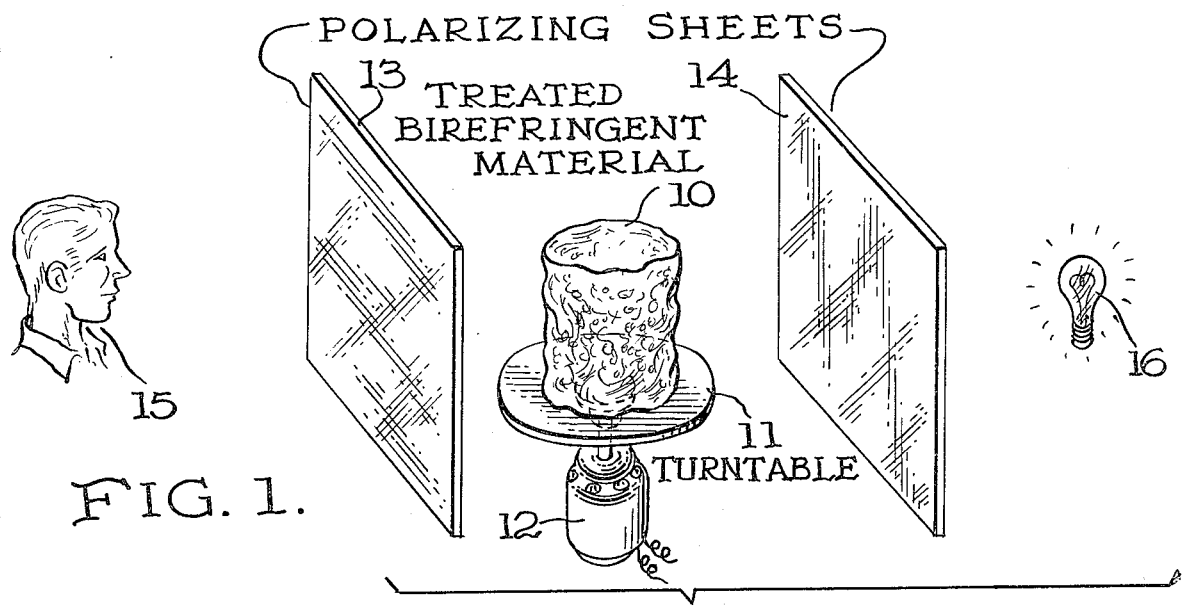
FIG. 1 is a diagrammatic perspective view of the display device of the present invention.

Referring to FIG. 1 there is shown birefringent form 10 mounted on turntable 11. A motor 12 is connected through proper gearing (not shown) so as to rotate turntable 11 at a desired slow speed. This display with birefringent form 10 is located between polarizing sheets 13 and 14 which may be flat as shown or curved to form a more esthetically pleasing display. A person 15 views the display on the opposite side from which light source 16 is located.

Figure 2:
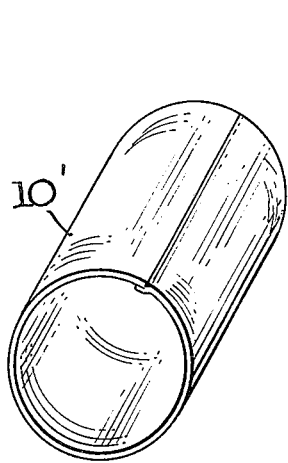
FIGS. 2–4 are steps in the preparation of the birefringent material forming the center of the display device.
Figure 3:
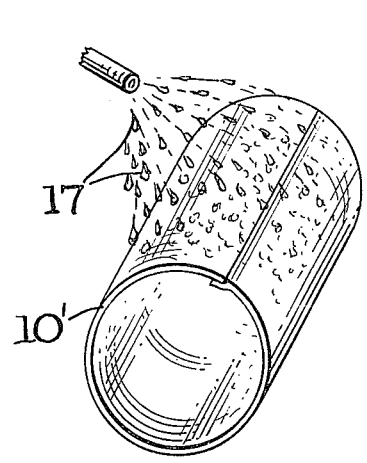
Figure 4:
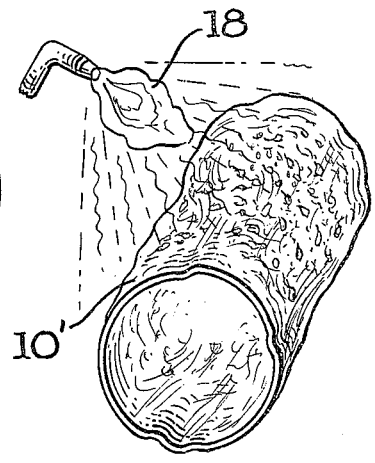
Figure 5:
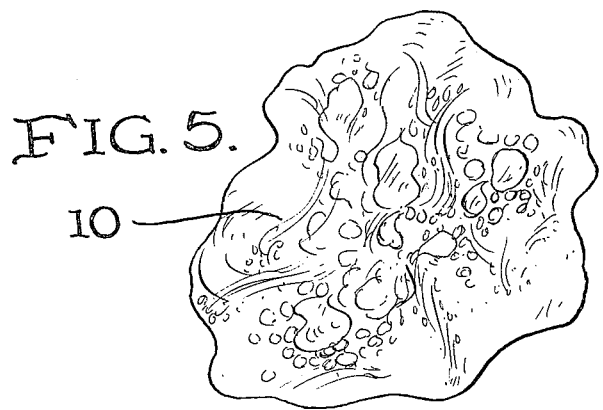
FIG. 5 is an enlarged view of a portion of the finished display form of the birefringent material shown in FIG. 1.

The birefringent form 10 is made by first taking a sheet of birefringent material and cutting and bending it to any desired shape such as in the form 10' shown in FIG. 2. Birefringent material may be used which is appropriate for the method described herein. Such forms of birefringent material which will partially fuse and warp under the heat produced by a flame from any source and which would be affected by such flame with droplets of water, or another non-flammable, non-volatile liquid, covering an area which would thus remain unaffected to some extent are well known in the prior art and are described in patents such as U.S. pat. No. 3,454,413 to Philip Miller issued July 8, 1969 and U.S. Pat. No. 3,315,391 to Thomas H. Lane et al issued Apr. 25, 1967, among others. Portions of the material may be made to overlap to enhance the visual effect. Then as shown in FIG. 3 the form 10' is sprinkled with many droplets of water 17 or of another non-flammable, nonvolatile liquid. A flame 18 as in FIG. 4 is then directed at various areas of the material. This causes the areas around the droplets to fuse partially and warp, whereas the areas covered by the droplets are protected from direct heat from flame 18 and remain essentially unaffected. A form 10 shown in FIG. 1 and with a portion shown enlarged in FIG. 5 is thus formed.

The difference in molecular structure thus produces forms 10, constituting an extremely attractive crystal-like texture. These forms are attractive for display purposes and if displayed with polarized light the display becomes very colorful. Such display is even further enhanced by movement of form 10 while using polarized light as in FIG. 1.

Due to the random spread of the liquid droplets, even with similarly located applications of flame, each form 10 will be different. In mass production methods, this would be preferred to the use of flame alone without liquid droplets, although this latter method is also a possible method of forming such birefringent forms but would not be productive of the many variations that would be formed utilizing the preferred method.

It will be obvious to those skilled in the art that various changes may be made without departing from the scope of the invention and the invention is not to be considered limited to what is shown in the drawings and described in the specification.

What is claimed is:

1. A method of preparing birefringent material which is subject to fusing and warping from the heat of a flame, for use in display devices for viewing in polarized light, comprising the steps of forming the birefringent material to a desired shape, spraying said birefringent material with non-flammable, non-volatile liquid droplets distributed to provide a random effect, applying a flame to various areas having droplets thereon wherein the areas under the droplets are protected thereby from direct heat of said flame and causing areas around the droplets to fuse partially and warp.

2. The method of claim 1, further comprising the step of mounting the birefringent material between sheets of polarizing material after applying the flame to portions of said birefringent material with a light source outside of said sheets of polarizing material.

3. The method of claim 2, further comprising the step of rotating the mounted birefringent material.

4. The method of claim 1, further characterized by overlapping of portions of said birefringent material during the forming step.

* * * * *